United States Patent [19]
Mizuno et al.

[11] Patent Number: 5,196,656
[45] Date of Patent: Mar. 23, 1993

[54] ELEVATOR DOOR CONTROL APPARATUS

[75] Inventors: Masamoto Mizuno; Terumi Hirabayashi; Masanori Tawada; Toshiyuki Kodera, all of Inazawa, Japan

[73] Assignee: Mitsubishi Denki Kabushiki Kaisha, Tokyo, Japan

[21] Appl. No.: 723,267

[22] Filed: Jun. 28, 1991

[30] Foreign Application Priority Data

Jun. 29, 1990 [JP] Japan .................. 2-169888

[51] Int. Cl.$^5$ .................. B66B 13/14
[52] U.S. Cl. .................. 187/103; 187/104; 307/75
[58] Field of Search .................. 187/109, 103, 29 R; 318/331, 212; 307/75

[56] References Cited

U.S. PATENT DOCUMENTS

| | | | |
|---|---|---|---|
| 3,814,214 | 6/1974 | Booker, Jr. .................. | 187/103 |
| 4,300,663 | 11/1981 | Hmelovsky et al. .................. | 187/29 R |
| 4,776,433 | 10/1988 | Lagree et al. .................. | 187/103 |
| 4,815,567 | 3/1989 | Ikejima .................. | 187/103 |
| 5,070,290 | 12/1991 | Iwasa et al. .................. | 187/109 |

Primary Examiner—A. D. Pellinen
Assistant Examiner—Lawrence Colbert
Attorney, Agent, or Firm—Leydig, Voit & Mayer

[57] ABSTRACT

An elevator door control apparatus includes an alternating current motor for opening and closing an elevator door. An inverter for converts a DC voltage from a first DC power supply into an AC voltage and supplies it to the motor. A first switching device for connects and disconnects the inverter and the motor, and a second switching device connects and disconnects a second DC power supply and the motor. A detection device detects at least one of an abnormality of the first DC power supply and an abnormality of the motor. A control device, at normal times supplies an AC voltage from the inverter to the motor by means of the first switching device and cuts off a DC voltage from the second DC power supply to the motor by means of the second switching device. When the detection device detects an abnormality, the control device cuts off an AC voltage from the inverter to the motor by means of the first switching device and supplies a DC voltage from the second DC power supply to the motor by means of the second switching device so as to cause a braking torque to be generated in the motor.

9 Claims, 7 Drawing Sheets $I_D = \sqrt{2} I_1$ $I_D = \sqrt{\frac{3}{2}} I_1$

ELEVATOR DOOR CONTROL APPARATUS

BACKGROUND OF THE INVENTION

1. Field of the Invention

The present invention relates to an elevator door control apparatus for controlling by means of an inverter the driving of a motor for opening and closing elevator doors.

2. Description of the Related Art

FIG. 7 shows the mechanical construction of a commonly used elevator door system. In FIG. 7, the elevator door system has a hanger case 4, a door control apparatus 14B fixed to the hanger case 4, a motor 10 for driving the doors, the motor being connected to the door control apparatus 14B, and a driving apparatus 9 provided onto the hanger case 4, in which apparatus a motor 10 is incorporated. A door 1 disposed on a hatchway 2 for a car is coupled to the driving apparatus 9 via a four-throw driving link 11. Disposed in the door 1 is an engagement apparatus 8 which is engaged by an apparatus disposed on a landing-place door (not shown) within a predetermined door zone for making the door 1 of an elevator car, move in linkage with a landing-place door. Also disposed in the door 1 is a door hanger 3 which moves along a rail 5 by means of hanger rollers 6 and upward thrust rollers 7 so as to guide the opening and closing of the door 1.

A door stopper 14A on the door open side and a door stopper 14 on the door closed side, each of which is made of an elastic body, are disposed in the hanger case 4. Also, an OLT sensor 13 for indicating a door-open state and a CLT sensor 12 for indicating a door-closed state are disposed in the hanger case 4. Furthermore, a door strike metal fitting 14C which strikes door stoppers 14 and 14A, and a metal fitting 14D for causing the OLT sensor 13 and the CLT sensor 12 to be activated are fixed to the door hanger 3.

The circuit diagram of a conventional door control apparatus 14B for controlling the above-described elevator door system is shown in FIG. 8.

A three-phase alternating current or a single-phase alternating current of 200 V or 220 V, for example, which is input from a power source is rectified by a diode bridge 15 and smoothed by a smoothing capacitor 16 to generate a dc voltage. The dc voltage is controlled to obtain a sine-wave motor current by an inverter 17 comprising switching elements such as transistors, FET's or the like. During this control, the switching elements of the inverter 17 are subjected to pulse width modulation by the PWM pulse generated from a PWM pulse generator 19. In this way, the speed and torque of the door driving motor 10 are controlled.

The speed of the door driving motor 10 is detected by an encoder 10A provided on the motor shaft. The speed $\omega_r^*$ detected by the encoder 10A is subtracted from the speed command $\omega_r$ generated from a speed command generator 22 in a microcomputer 31 at a first addition point 23 to determine a speed deviation $\Delta \omega_r$. The speed deviation $\Delta \omega_r$ is input to a speed amplifier 24, which calculates torque necessary for the door driving motor 10 in accordance with the speed command $\omega_r$ and inputs to a slip calculating section 26 a torque command, e.g., a current iq corresponding to the torque and a current command id corresponding to excitation, which is generally a constant value within a constant torque region. The slip calculating section 26 generates a slip frequency $\omega_s$. The slip frequency $\omega_s$ is added to the speed $\omega_r^*$ detected by the encoder 10A at a second addition point 27 and then input to a phase counter 28 serving as an integrator. In the phase counter 28, the rotational angle of the driving motor is calculated by the equation, $\theta_r = \int (\omega_r^* \pm \omega_s)$ dt.

The phase angle $\theta_i$, which is calculated from the current iq corresponding to the torque and the current command id corresponding to excitation by a phase angle calculating section 30, is added to the rotational angle $\theta_r$ of the magnetic field at a third addition point 29 to determine an actual current phase angle $\theta = \theta_r + \theta_i$. From the phase angle $\theta$ and the current amplitude $|I|$ generated from a current amplitude calculating section 25, a current command generating section 21 generates a U-phase current command $Iu = |I| \cdot \sin \theta$ and a V-phase current command $I_v = |I| \cdot \sin (\theta + \frac{2}{3}\pi)$. From the current commands and the actual motor currents $I_u^*$, $I_v^*$, which are respectively detected by dc current transformers 18, deviations $\Delta I_u$, $\Delta I_v$ and $\Delta I_w = -\Delta I_u - \Delta I_v$ are determined by a DC amplifier 20. A three-phase PWM voltage command corresponding to the three deviation values is generated from a PWM pulse generator 19. The pulse train is supplied to the inverter 17 so as to actuate the switching elements thereof. This permits the current, voltage and frequency of the door driving motor 10 to be respectively controlled to predetermined values. The above-described series of operations control the rotational speed and the torque of the door driving motor 10.

In FIG. 8, reference numeral 32 denotes a power-supply cutoff detector. Reference numeral 33 denotes an abnormality detector which is activated when an excess current of an motor occurs, or a routine of a watch timer for detecting an abnormality of a microcomputer 31 is executed. Reference numeral 34 denotes an OR gate for carrying out the logical OR between the output of the power-supply cutoff detector 32 and the output signal of the abnormality detector 33. Reference numeral 35 denotes a relay driver for outputting a signal indicating that the door control apparatus 14B is operating normally on the basis of the output signal of the OR gate 34.

Next, the operation of the above-described conventional elevator door control apparatus 14B will be explained.

When an input power supply falls below a predetermined voltage or is stopped, the power-supply cutoff detector 32 is activated. The output signal of the detector 32 causes the base of an inverter 17 to be shut off through an OR gate 34, with the result that the current of a door driving motor 10 is cut off. Also, when the abnormality detector 33 is activated by an excess current of a motor or a routine of a watch timer for detecting an abnormality of a microcomputer 31 is executed, the current of the door driving motor 10 is cut off in a manner similar to that described above.

FIG. 9 shows the characteristics of the usual speed of the door 1 when the door is closed. Usually, the speed of the door 1 is accelerated as 0→A→B, reaches a maximum speed, and is decelerated as B→C→D. Suppose that, when the speed of the door 1 reaches near the maximum speed indicated at point B, the input power supply decreases or is stopped, thereby causing power-supply cutoff detector 32 to be actuated. At this time, as shown by the dashed line in FIG. 9, the door 1 runs freely as B→E from the maximum speed due to its own inertia energy without being braked and strikes the door stopper 14 on the door closed side. For this reason, there has been the problem that when a person is sandwiched in the door 1, the door does not stop or move in reversely, which is very dangerous.

SUMMARY OF THE INVENTION

The present invention has been devised to solve the above-mentioned problems. It is accordingly an object of the present invention to obtain an elevator door control apparatus which is capable of ensuring safety even if an input voltage decreases or a stoppage of power occurs while an elevator door is being closed.

An elevator door control apparatus according to the present invention includes an alternating current motor for opening and closing an elevator door. An inverter converts a DC voltage from a first DC power supply to an AC voltage and supplies it to the motor. A first switching means connects and disconnects the inverter and the motor, and a second switching means connects and disconnects a second DC power supply and the motor. A detection means for detects at least one of an abnormality of the first DC power supply and an abnormality of the motor. A control means at normal times supplies an AC voltage from the inverter to the motor by means of the first switching means and cuts off a DC voltage from the second DC power supply to the motor by means of the second switching means, when the detection means detects an abnormality, the control means cuts off an AC voltage from the inverter to the motor by means of the first switching means and supplies a DC voltage from the second DC power supply to the motor by means of the second switching means so as to cause a braking torque to be generated in the motor.

DESCRIPTION OF THE PREFERRED EMBODIMENT

An embodiment of the present invention will be explained hereinbelow with reference to the accompanying drawings.

Figure 1:
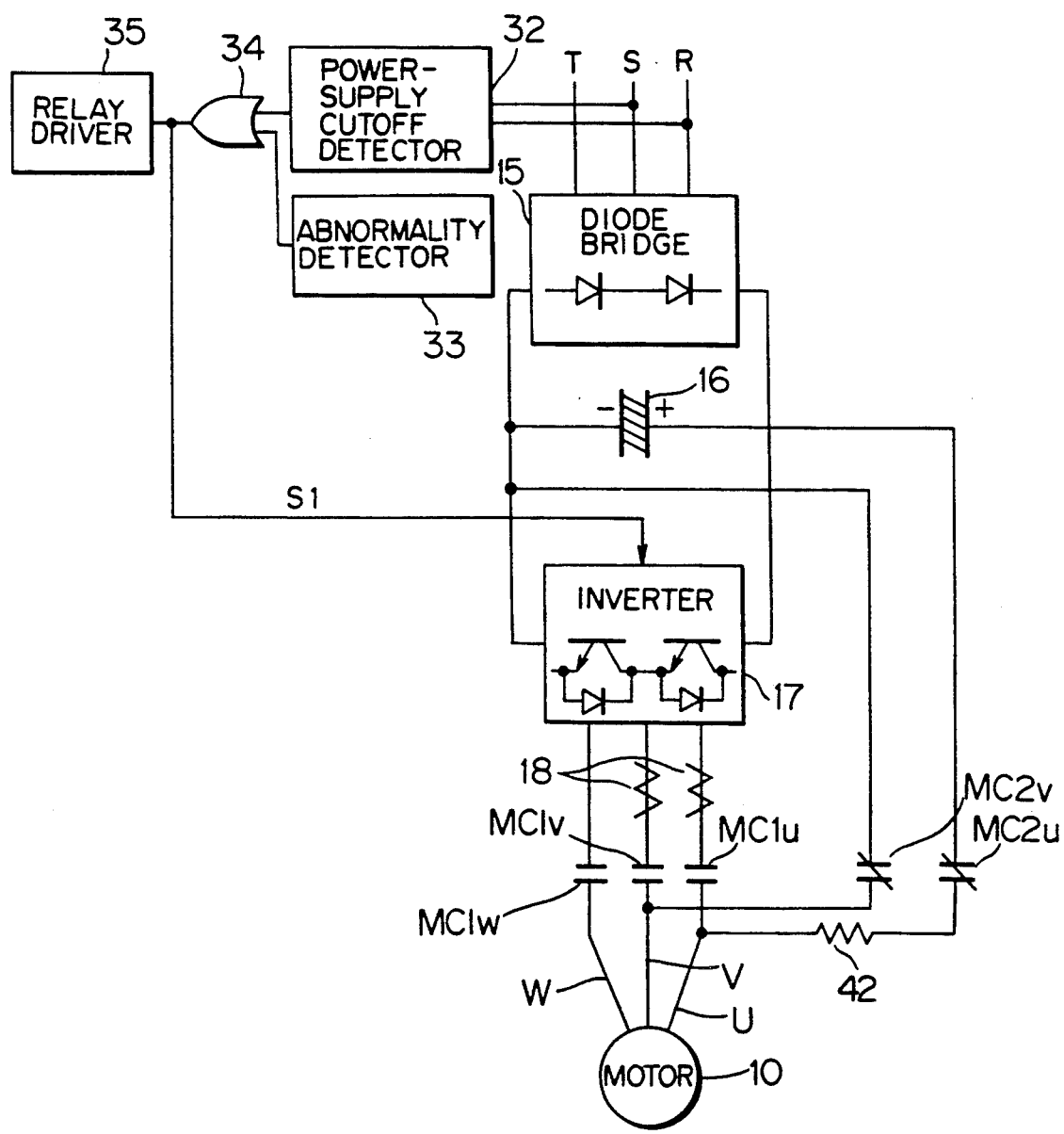
FIG. 1 is a block diagram showing an embodiment of an elevator door control apparatus of the present invention.

In FIG. 1, a diode bridge 15 is connected to commercial power supplies R, S, and T. A smoothing capacitor 16 and an inverter 17 are connected to the diode bridge 15. Each of the outputs of the U, V, and W phase of the inverter 17 is connected to an alternating current motor 10 for driving doors via make contacts MC1u, MC1v, and MC1w of a relay MC1 (not shown), respectively.

A power-supply cutoff detector 32 for detecting the power-supply cutoff is connected to commercial power supplies R and S. An abnormality detector 33 is provided for detecting an excess current of the motor 10 and an abnormality of an unillustrated microcomputer or the like. The outputs of the power-supply cutoff detector 32 and the abnormality detector 33 are input to an OR gate 34. The output of the OR gate 34 is connected to the inverter 17 and also to a relay driver 35.

Figure 8:
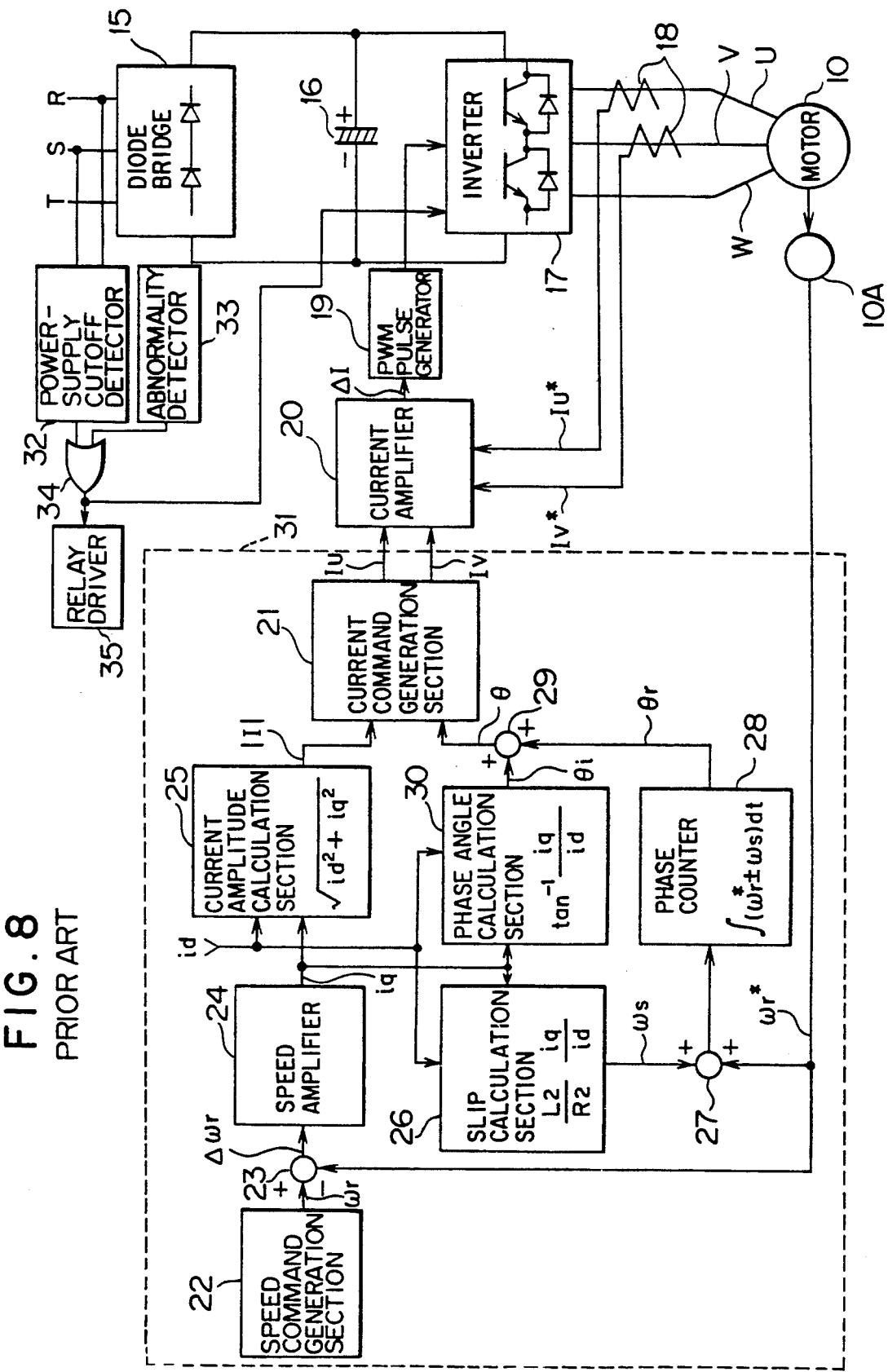
FIG. 8 is a block diagram of a conventional elevator door control apparatus.
Figure 9:
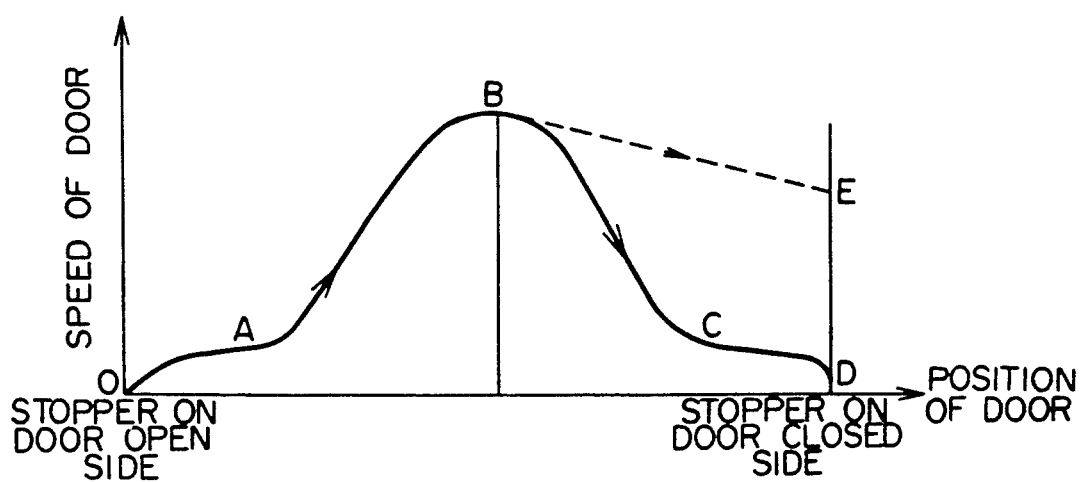
FIG. 9 is a graph of the speed of an elevator door as a function of time during the operation of the door control apparatus shown in FIG. 8.

The positive terminal of the smoothing capacitor 16 is connected to the U phase of the motor 10 via the break contact MC2u of a relay MC2 for direct current braking and a current limit resistor 42. On the other hand, the negative terminal of the smoothing capacitor 16 is connected to the V phase of the motor 10 via the break contact MC2v of the relay MC2 for direct current braking. In this embodiment, u make contact u refers to a normally open contact which is open when the relay is not energized and conducts when the relay is energized. Break contact u refers to a normally closed contact which conducts when the relay is not energized and opens when the relay is energized. Reference numeral 18 denotes a direct current transformer for detecting the U-phase motor current and the V-phase motor current. An encoder 10A, a PWM pulse generator 19, a current amplifier 20, and a microcomputer 31, all of which are shown in FIG. 8, are disposed in the door control apparatus, though not shown in FIG. 1. On the door control apparatus of the present embodiment, make contacts MC1u, MC1v, and MC1w of the relay MC1 are respectively provided in the U, V, and W phase of the motor 10, and the positive terminal of the smoothing capacitor 16 is connected to the U phase of the motor 10 via the break contact MC2u of the relay MC2, and the current limit resistor 42. The negative terminal of the smoothing capacitor 16 is connected to the V phase of the motor 10 via the break contact MC2v of the relay MC2.

Figure 2:
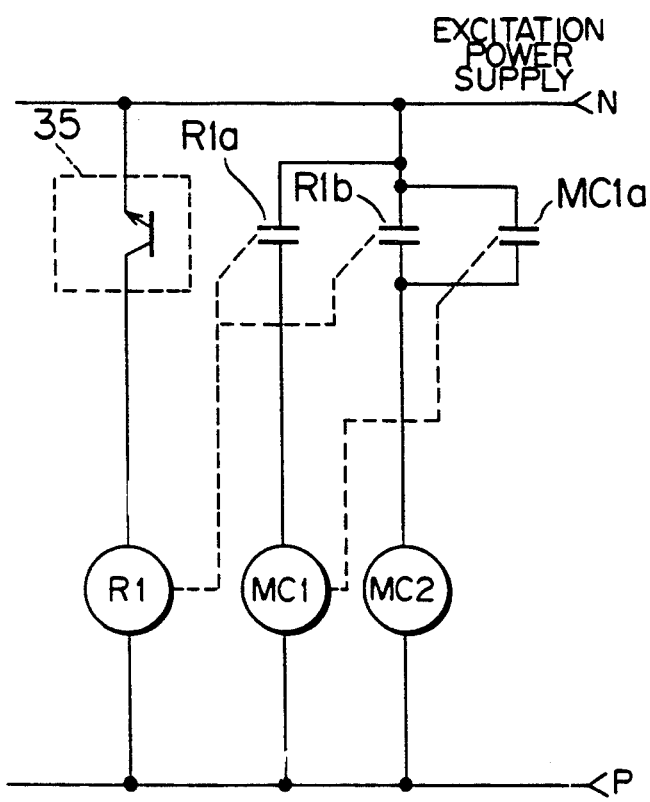
FIG. 2 is a circuit diagram showing the connection of relays for controlling the opening and closing of each contact in the embodiment of FIG. 1.

As shown in FIG. 2, the relay driver 35 and the coil of a relay R1 are connected in series between excitation power supplies P and N. Also, the make contact R1a of the relay R1 and the coil of the relay MC1 are connected in series between excitation power supplies P and N. The make contact R1b of the relay R1 and the coil of a relay MC2 are connected in series between excitation power supplies P and N. The make contact MC1a of the relay MC1 is connected in parallel to the make contact R1b of the relay R1.

Next, the operation of this embodiment will be described. First, the outputs of the power-supply cutoff detector 32 and the abnormality detector 33 are both "L" level at normal times, and these outputs are input to relay driver 35 via the OR gate 34. As a result, the relay driver 35 is turned on and the coil of the relay R1 is energized, causing both its make contacts R1a and R1b to be closed. For this reason, each of the coils of the relays MC1 and MC2 is energized, causing make contacts MC1u, MC1v, and MC1w of the relay MC1 to be closed and causing break contacts MC2u and MC2v of the relay MC2 to be open.

As a result, a three-phase AC voltage is supplied to the motor 10 from the inverter 17 via contacts MC1u, MC1v, and MC1w, causing the motor 10 to be driven. At this time, since the break contacts MC2u and MC2v of the relay MC2 are open, a DC braking voltage is not supplied to the motor 10 from the smoothing capacitor 16.

Figure 3:
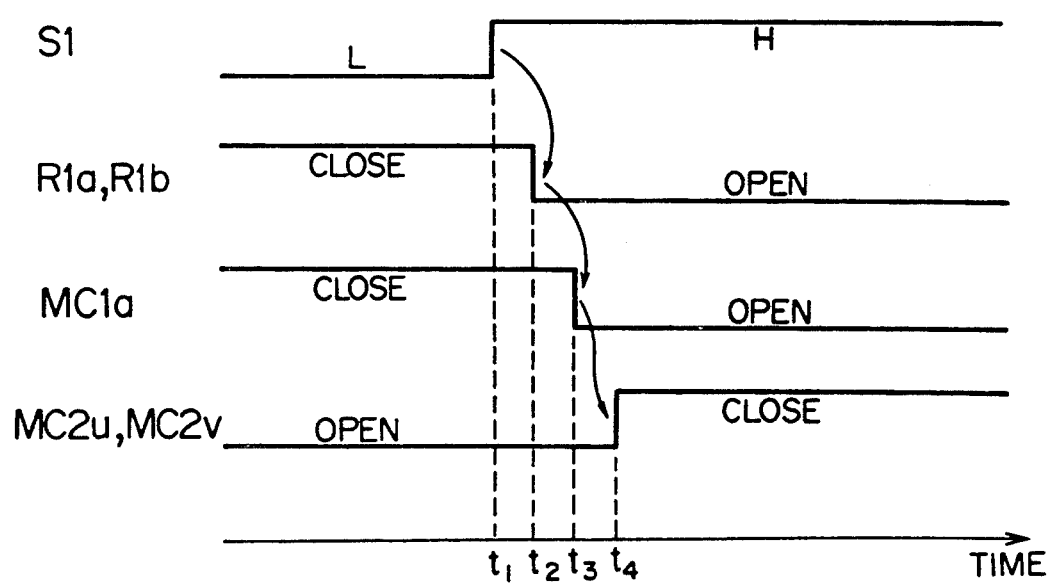
FIG. 3 is a timing chart showing the operation of the embodiment of FIG. 1.

In this embodiment, as shown in FIG. 3, when the power-supply cutoff detector 32 detects the stoppage of the commercial power supplies R, S, and T at time $t_1$ while the motor 10 is being driven and outputs a "H" level signal, or when the abnormality detector 33 detects a motor excess current or the like and outputs a "H" level signal, this output signal is input to the inverter 17 via the OR gate 34 with the signal serving as a base shut-off signal S1. As a consequence, the base of the inverter 17 is shut off, thereby stopping the supply of an AC voltage to the motor 10.

The "H" level output signal from the OR gate 34 is also input to the relay driver 35. Hence, the relay driver 35 is turned off. The coil of the relay R1 is de-energized, causing the make contacts R1a and R1b of the relay R1 to open at time $t_2$. As a result, the coil of the relay MC1 is de-energized, thereby causing the make contact MC1a of the relay MC1 to open at time $t_3$ and causing make contacts MC1u, MC1v, and MC1w of the relay MC1 connected between the inverter 17 and the motor 10 to be open. As a consequence, the inverter 17 is isolated from the motor 10.

If the make contact R1b of the relay R1 opens at time $t_2$, the coil of the relay MC2 is energized by the excitation power supply because the make contact MC1a of the relay MC1 is still in a closed state. Accordingly, brake contacts MC2u and MC2v of the relay MC2 remain in an open state at time $t_3$. The coil of the relay MC2 is de-energized at time $t_3$ as the result of the opening of the make contact MC1a of the relay MC1. Thus, the brake contacts MC2u and MC2v of the relay MC2 are closed at time $t_4$. For this reason, the positive and negative terminals of the smoothing capacitor 16 are respectively connected to the U and V phases of the motor 10, and a DC braking voltage is supplied to the motor 10 from the smoothing capacitor 16 via the current limit resistor 42. As a result, a braking torque is generated in the AC motor 10, causing the motor 10 to stop rotating. That is, the door of an elevator driven by the motor 10 is stopped.

Figure 4:
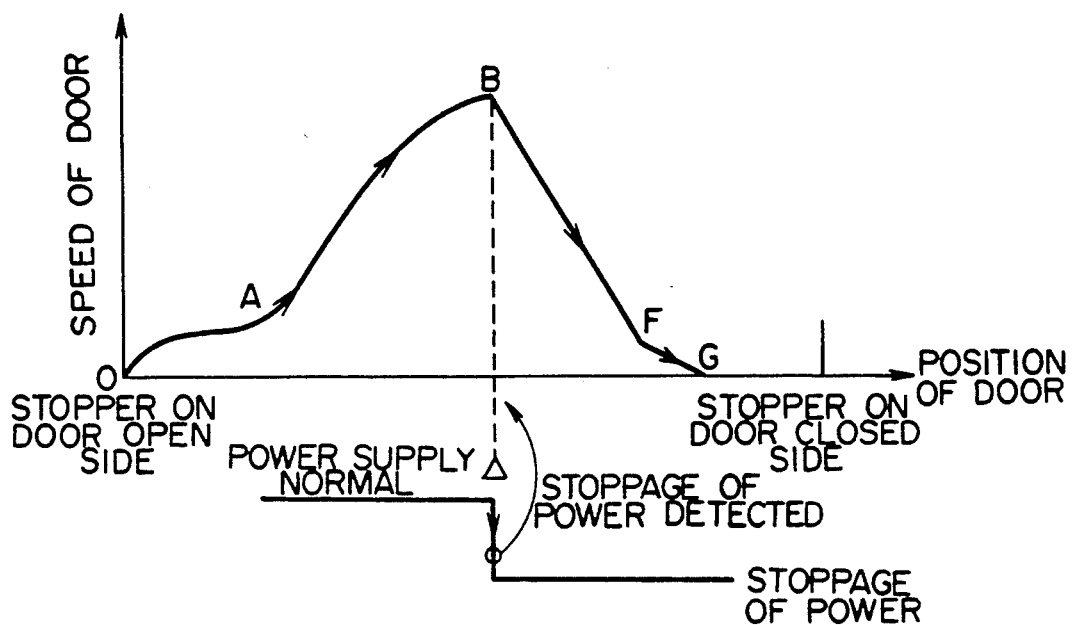
FIG. 4 is a graph of the speed of an elevator door during closing.

Therefore, as shown in FIG. 4, if a stoppage of power or the like occurs when the speed of a door is accelerated as 0→A→B and reaches a maximum speed while the door is closed, the door will not run away but the movement is braked as B→F→G and it stops quickly.

Figure 5:
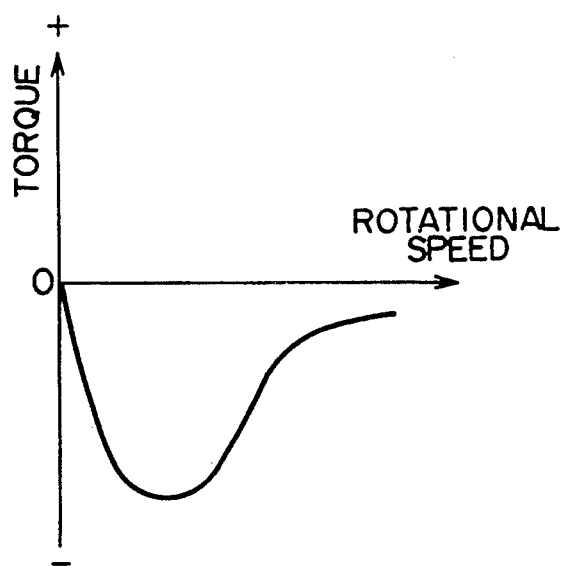
FIG. 5 is a graph of the braking torque of a motor as a function of rotational speed.
Figure 7:
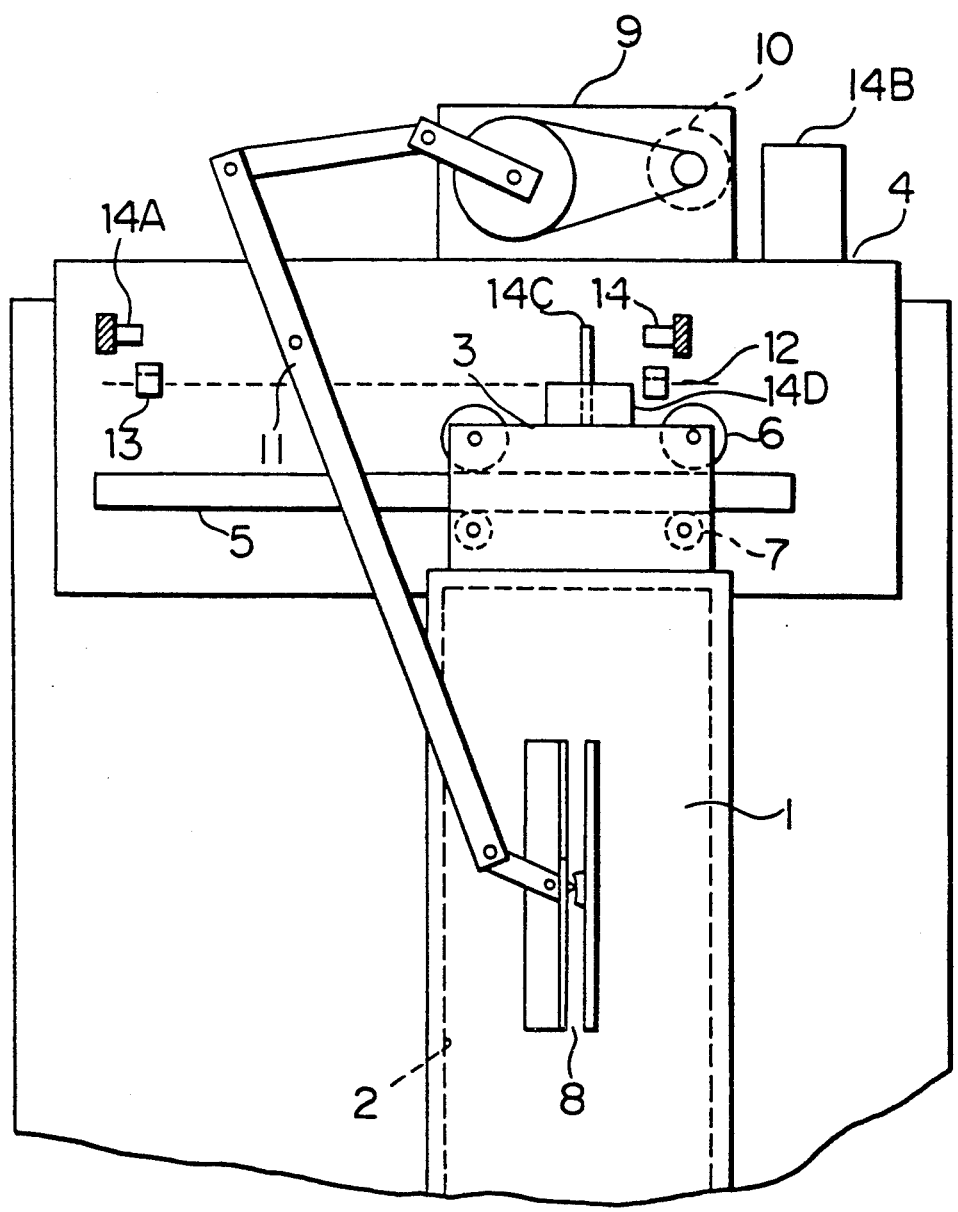
FIG. 7 is a schematic view of the mechanical structure of a commonly used elevator door system.

It is known that a braking torque which is generated in an AC motor when the AC motor is DC-energized during rotation is related to its rotational speed as shown in FIG. 5. As can be seen from FIG. 5, the magnitude of the braking torque decreases as the rotational speed nears 0. However, no problem is posed if the braking force decreases at the time of a low-speed movement because as shown in FIG. 7, door stoppers 14 and 14A are disposed on the door open and closed sides of an elevator.

Figure 6A:
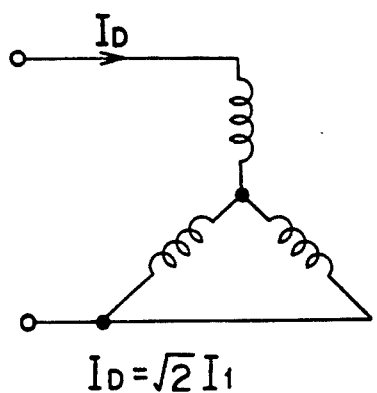
FIGS. 6A and 6B each show an example of the connection of the motor.
Figure 6B:
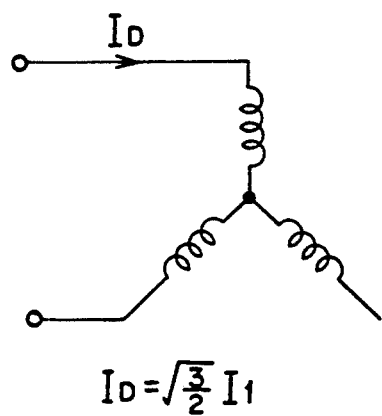

Various methods of connecting the motor 10, may be used. For example, in the case of a star connection for the motor 10, a connection method shown in FIG. 6A or 6B may be adopted. In FIGS. 6A and 6B, $I_D$ denotes a DC braking current supplied via the current limit resistor 42, and $I_1$ denotes a three-phase AC current.

Although a DC voltage for braking a motor is supplied from the smoothing capacitor 16 in the above-described embodiment, other means may be used to supply a DC voltage. For example, a special-use battery may be disposed to supply a voltage for DC braking from this battery.

What is claimed is:

1. An elevator door control apparatus comprising:
    alternating current motor for opening/closing elevator doors;
    an inverter for converting a DC voltage from a first DC power supply into an AC voltage and supplying it to the motor;
    a first opening/closing means for supplying voltage from the inverter to the motor;
    a second opening/closing means for supplying voltage from a second DC power supply to the motor;
    detection means for detecting at least either one of an abnormality of the first DC power supply or an abnormality of the motor; and
    control means that, at normal times, supplies an AC voltage from the inverter to the motor by means of the first opening/closing means and cuts off a DC voltage from the second DC power supply to the motor by means of the second opening/closing means, and that, when the detection means detects an abnormality, cuts off an AC voltage from the inverter to the motor by means of the first opening/closing means and supplies a DC voltage from the second DC power supply to the motor by means of the second opening/closing means so as to cause a braking torque to be generated in the motor.

2. A door control apparatus according to claim 1 wherein the second opening/closing means comprises an electromagnetic contactor which becomes open by energization and closed by de-energization.

3. A door control apparatus according to claim 1 wherein the second DC power supply comprises the first DC power supply.

4. A door control apparatus according to claim 1 wherein the detection means is a power-supply cutoff detector which detects that the voltage of the first DC power supply falls below a predetermined value.

5. A door control apparatus according to claim 1 wherein the detection means is an abnormality detector which detects an excess current of the motor.

6. An elevator door control apparatus comprising:
    an AC motor for opening and closing an elevator door;
    a first power supply for supplying AC power to the motor;
    abnormality detecting means for detecting an abnormality in at least one of the first power supply abnormality and the motor;
    a second power supply for generating DC power; and
    switching means responsive to the abnormality detecting means for connecting the motor to the second power supply to generate a braking torque when the abnormality detecting means detects an abnormality.

7. The door control apparatus as claimed in claim 6 wherein the first power supply comprises an inverter connected to the second power supply for converting DC power from the second power supply into AC power.

8. The door control apparatus as claimed in claim 6 wherein the motor is a three-phase motor having three windings, and the switching means comprises means for connecting the second power supply to two of the three windings.

9. The door control apparatus as claimed in claim 6 wherein the switching means comprises means for disconnecting the first power supply from the motor when the abnormality detecting means detects an abnormality.

* * * * *